United States Patent
Kuwajima et al.

(10) Patent No.: US 7,601,395 B2
(45) Date of Patent: Oct. 13, 2009

(54) MAGNETIC RECORDING MEDIUM AND METHOD FOR MANUFACTURING THE SAME

(75) Inventors: Takayoshi Kuwajima, Tokyo (JP); Sadafumi Iijima, Tokyo (JP)

(73) Assignee: TDK Corporation, Tokyo (JP)

( * ) Notice: Subject to any disclaimer, the term of this patent is extended or adjusted under 35 U.S.C. 154(b) by 213 days.

(21) Appl. No.: 11/032,080

(22) Filed: Jan. 11, 2005

(65) Prior Publication Data

US 2005/0208342 A1 Sep. 22, 2005

(30) Foreign Application Priority Data

Jan. 13, 2004 (JP) ............................. 2004-005884

(51) Int. Cl.
*B05D 3/02* (2006.01)
(52) U.S. Cl. .................... 427/372.2; 427/127; 427/128; 427/130
(58) Field of Classification Search ....................... None
See application file for complete search history.

(56) References Cited

U.S. PATENT DOCUMENTS

| | | | | |
|---|---|---|---|---|
| 4,562,117 | A | * 12/1985 | Kikukawa et al. | ........... 428/407 |
| 5,688,591 | A | * 11/1997 | Kuwajima et al. | .......... 428/323 |
| 6,627,293 | B1 | * 9/2003 | Inoue et al. | ................. 428/141 |
| 6,852,404 | B2 | * 2/2005 | Kuwajima et al. | ....... 428/839.3 |
| 7,160,481 | B2 | * 1/2007 | Yamazaki et al. | ......... 252/62.54 |
| 2004/0013795 | A1 | * 1/2004 | Yamazaki et al. | ............ 427/128 |
| 2004/0110033 | A1 | * 6/2004 | Kuwajima et al. | ...... 428/694 R |
| 2006/0124887 | A1 | * 6/2006 | Yamazaki et al. | ........ 252/62.54 |

FOREIGN PATENT DOCUMENTS

| | | |
|---|---|---|
| JP | 2001-351224 | 12/2001 |
| JP | 2002-367159 | 12/2002 |

\* cited by examiner

*Primary Examiner*—D. Lawrence Tarazano
*Assistant Examiner*—Gary D Harris
(74) *Attorney, Agent, or Firm*—Oblon, Spivak, McClelland, Maier & Neustadt, L.L.P.

(57) ABSTRACT

A high recording density magnetic recording medium and a manufacturing method therefor are provided. The dilution stability during preparation of magnetic paint is improved and, thereby, even when the magnetic paint concentration is lowered, no problem occurs with the surface roughness and the output of the thin magnetic layer. The magnetic recording medium includes at least a magnetic layer on one surface of a non-magnetic support, wherein the magnetic layer contains a magnetic powder, a vinyl chloride resin having a degree of polymerization of at least 270 and an aliphatic polyester polyurethane resin to serve as binder resins, an aromatic compound having a substituent R (where R is —COOH, —(COOH)$_2$, —OPO(OH)$_2$, —PO(OH)$_2$, or —SO$_3$H), and a phosphoric acid ester. The ratio of binder resins in the magnetic paint is set at 2.0 percent by weight or less relative to a total sum of the binder resins and a solvent.

11 Claims, No Drawings

MAGNETIC RECORDING MEDIUM AND METHOD FOR MANUFACTURING THE SAME

BACKGROUND OF THE INVENTION

1. Field of the Invention

The present invention relates to a magnetic recording medium and a method for manufacturing the same. In particular, the present invention relates to a high recording density magnetic recording medium including a thin magnetic layer, wherein the dilution stability during preparation of magnetic paint is improved.

2. Description of the Related Art

In general, magnetic paint for a magnetic recording medium is manufactured through the steps in which, for example, a magnetic paint composition composed of a magnetic powder, a binder resin, an organic solvent, and other necessary components is supplied to a medium dispersion type mill or the like including a mixing vessel filled in with dispersion media, e.g., glass beads, and is forcedly agitated together with the dispersion media by an agitation device built in the mixing vessel.

In recent years, magnetic layers have been made thinner due to requirements for further increase in the recording density. Accompanying this, the paint concentration of the magnetic paint tends to be lowered. In a commonly used technique for preparing such low concentration paint, dispersion of the paint is performed at a somewhat high concentration, the resulting paint is diluted to attain a final paint concentration, and dispersion is further performed.

With respect to technologies for improving the manufacturing process of magnetic paint used for such a thin magnetic layer, for example, Japanese Unexamined Patent Application Publication No. 2002-367159 discloses a method for manufacturing a magnetic recording medium, in which a predetermined organic solvent is used for the paint to form a magnetic layer and, thereby, a thin magnetic layer can be formed without occurrence of any inconvenience, e.g., reduction in the degree of orientation. Japanese Unexamined Patent Application Publication No. 2001-351224 discloses that the stability of paint is improved by using a phosphoric acid ester based compound and/or phenylphosphonic acid as a dispersing agent in a non-magnetic layer.

As described above, in the preparation of the magnetic paint, a step of diluting the high concentration paint to the low concentration paint is performed. However, as the final concentration is lowered with decrease in the thickness of the magnetic layer, when the high concentration paint after dispersion is diluted to have an aimed low concentration, that is, about 2.0 percent by weight or less in terms of the concentration of the binder resin (=resin/(resin+solvent)) (hereafter may be referred to as "La concentration"), a problem occurs in that the gloss of paint after the dilution is deteriorated compared with the gloss of the paint before the dilution. This deterioration of the dilution stability of the paint deteriorates the surface roughness after application of the magnetic layer and processing, and causes reduction in the output. Therefore, it is required to overcome these problems.

SUMMARY OF THE INVENTION

Accordingly, it is an object of the present invention to provide a high recording density magnetic recording medium and a method for manufacturing the same, wherein the dilution stability during preparation of the magnetic paint is improved and, thereby, no problem occurs with respect to the surface roughness and the output of the magnetic layer even when the magnetic paint concentration is lowered in accordance with a thin magnetic layer.

The inventors of the present invention conducted intensive research, and found out that by specifying the magnetic paint to have a predetermined composition, the dilution stability was able to be excellently ensured even when the La concentration was lowered, and a high recording density magnetic recording medium could be attained, wherein no problem occurred with respect to the surface roughness and the output of the magnetic layer. Consequently, the present invention has been completed.

A magnetic recording medium according to an aspect of the present invention includes at least a magnetic layer on one surface of a non-magnetic support, wherein the magnetic layer contains a magnetic powder, a vinyl chloride resin having a degree of polymerization of at least 270 and an aliphatic polyester polyurethane resin to serve as binder resins, an aromatic compound having a substituent R (where R is selected from the group consisting of —COOH, —(COOH)$_2$, —OPO(OH)$_2$, —PO(OH)$_2$, and —SO$_3$H), and a phosphoric acid ester.

In the present aspect, preferably, the content of the above-described aromatic compound is within the range of 0.5 to 3 parts by weight relative to 100 parts by weight of the above-described magnetic powder, and preferably, the content of the above-described phosphoric acid ester is within the range of 0.5 to 3 parts by weight relative to 100 parts by weight of the above-described magnetic powder. The ratio of the above-described aliphatic polyester polyurethane resin to the total amount of the binder resins is preferably at least 10 percent by weight. Furthermore, preferably, the weight ratio of the above-described vinyl chloride resin to the above-described polyurethane resin is within the range of 8:2 to 2:8, and preferably, the above-described aromatic compound is phthalic acid. The film thickness of the above-described magnetic layer may be within the range of 0.05 to 0.3 μm.

According to another aspect of the present invention, a method for manufacturing a magnetic recording medium by applying magnetic paint to a non-magnetic support is provided, the method including the step of setting the concentration of the magnetic paint during the application at 2.0 percent by weight or less in terms of the ratio of binder resins to a total sum of the binder resins and a solvent. A non-magnetic layer is preferably formed on the non-magnetic support by performing at least application of non-magnetic paint thereto and drying.

Japanese Unexamined Patent Application Publication No. 2002-367159 discloses the method for manufacturing a magnetic recording medium related to the formation of a thin magnetic layer, as described above. However, in this patent document, there is no description related to the dilution stability of the magnetic paint, in contrast to an object of the present invention. Japanese Unexamined Patent Application Publication No. 2001-351224 discloses a technology related to the improvement of a non-magnetic layer, and the composition of the magnetic layer is not aimed at attaining the dilution stability.

According to the present invention, since the magnetic layer has the above-described composition, the dilution stability can be improved during the preparation of the magnetic paint, and a high recording density magnetic recording medium can be attained, wherein deterioration of the surface roughness and deterioration of the output resulting therefrom do not occur even when the magnetic layer is formed from a thin layer.

DESCRIPTION OF THE PREFERRED EMBODIMENTS

Preferred embodiments of the present invention will be described below in detail.

A magnetic recording medium of the present invention includes at least a magnetic layer on one surface of a non-magnetic support, wherein the magnetic layer contains a magnetic powder, a vinyl chloride resin having a degree of polymerization of at least 270 and an aliphatic polyester polyurethane resin to serve as binder resins, an aromatic compound having a substituent R (where R is selected from the group consisting of —COOH, —(COOH)$_2$, —OPO(OH)$_2$, —PO(OH)$_2$, and —SO$_3$H), and a phosphoric acid ester.

The magnetic powder is not specifically limited. Examples thereof may include ferromagnetic oxide powders, e.g., γ-Fe$_2$O$_3$, Fe$_3$O$_4$, a solid solution of γ-Fe$_2$O$_3$ and Fe$_3$O$_4$, Co-compound-adhered γ-Fe$_2$O$_3$, Co-compound-doped γ-Fe$_2$O$_3$, Co-compound-adhered Fe$_3$O$_4$, Co-compound-doped Fe$_3$O$_4$, a solid solution of Co-compound-adhered γ-Fe$_2$O$_3$ and Co-compound-adhered Fe$_3$O$_4$, a solid solution of Co-compound-doped γ-Fe$_2$O$_3$ and Co-compound-doped Fe$_3$O$_4$, and CrO$_2$; and previously known magnetic metal powders (ferromagnetic metal powders) primarily containing Fe, Ni, or Co, e.g., Fe—Co—Ni alloys, Fe—Al alloys, Mn—Bi alloys, Fe—Al—P alloys, Fe—Co—Ni—Cr alloys, Fe—Ni—Zn alloys, Fe—Co—Ni—P alloys, Fe—Ni alloys, Co—Ni alloys, Co—P alloys, Fe—Mn—Zn alloys, and Fe—Ni—Cr—P alloys.

In the present invention, most of all, it is preferable that an acicular ferromagnetic metal powder having an average major-axis length x of 130 nm or less, in particular, of 30 to 100 nm is used as a high-recording-density-compatible magnetic powder composed of fine particles. If the average major-axis length exceeds 130 nm, undesirably, the electromagnetic conversion characteristic (in particular, S/N and C/N characteristics) required of the magnetic recording medium tends to be not adequately satisfied. A hexagonal iron oxide powder, e.g., barium ferrite, may be used. Preferably, the plate ratio of the hexagonal iron oxide powder is 2 to 7. Preferably, the average primary plate diameter determined by TEM observation is 10 to 50 nm. If this is large, the surface property of the magnetic layer tends to be deteriorated.

It is preferable that the content of the above-described magnetic powder is about 70 to 90 percent by weight in the magnetic layer composition. If the content of the magnetic powder is too large, the content of the binder resin is decreased and, thereby, the surface smoothness resulting from calendering tends to be deteriorated. On the other hand, if the content is too small, it becomes difficult to attain a high playback output.

A vinyl chloride resin having a degree of polymerization of at least 270, preferably at least 300, and an aliphatic polyester polyurethane resin are used as binder resins of the magnetic layer. If the degree of polymerization of the vinyl chloride resin is less than 270, the gloss is significantly reduced when the paint is diluted. The reason for this is believed that the La concentration is reduced by the dilution and, thereby, peeling of the binder resin from, for example, the magnetic powder, coagulation, and the like occur. The reduction of the gloss is significantly observed with respect to the vinyl chloride resin having a degree of polymerization of less than 270. When the degree of polymerization of the vinyl chloride resin is at least 400, the viscosity of the paint is significantly increased. Therefore, preferably, the degree of polymerization is less than 400. Examples of suitable vinyl chloride resins may include MR110 (degree of polymerization 300), MR112 (degree of polymerization 330), and MR113 (degree of polymerization 320) produced by ZEON Corporation. Examples of aliphatic polyester polyurethane resins may include UR8700 produced by Toyobo Co., Ltd., although not limited to them. With respect to the aliphatic polyester polyurethane resin, it is believed that peeling from, for example, the magnetic powder, coagulation, and the like are unlikely to occur, when the paint is diluted.

Here, the polyurethane resin is produced by a reaction between a hydroxyl-containing resin and isocyanate. Examples of hydroxyl-containing resins include polyalkylene glycols, e.g., polyethylene glycol, polybutylene glycol, and polypropylene glycol; alkylene oxide adducts of bisphenol A and the like; and various polyester polyols having glycols and hydroxyl groups at molecular chain terminals. Resins produced by the use of polyester polyols among them as hydroxyl-containing resins are polyester polyurethane resins. The polyester polyol is composed of a carboxylic acid component and a glycol component.

Examples of carboxylic acid components of polyester polyols may include aromatic dicarboxylic acids, e.g., terephthalic acid, isophthalic acid, orthophthalic acid, and 1,5-naphthalic acid; aromatic oxycarboxylic acids, e.g., p-hydroxy benzoic acid and p-(hydroxyethoxy)benzoic acid; aliphatic dicarboxylic acids, e.g., succinic acid, adipic acid, azelaic acid, sebacic acid, and dodecanedicarboxylic acid; unsaturated aliphatic acids and alicyclic dicarboxylic acids, e.g., fumaric acid, maleic acid, itaconic acid, tetrahydrophthalic acid, and hexahydrophthalic acid; and tri and tetracarboxylic acids, e.g., trimellitic acid, trimesic acid, and pyromellitic acid.

Examples of glycol components of polyester polyols include ethylene glycol, propylene glycol, 1,3-propanediol, 1,4-butanediol, 1,5-pentanediol, 1,6-hexanediol, neopentyl glycol, diethylene glycol, dipropylene glycol, 2,2,4-trimethyl-1,3-pentanediol, 1,4-cyclohexanedimethanol, ethylene oxide adducts and propylene oxide adducts of bisphenol A and the like, ethylene oxide and propylene oxide adducts of hydrogenated bisphenol A, polyethylene glycol, polypropylene glycol, and polytetramethylene glycol. Furthermore, tri and tetraols, e.g., trimethylolethane, trimethylolpropane, glycerin, and pentaerythritol, may be used simultaneously.

Other examples of polyester polyols include lactone-based polyester diol chains produced by ring-opening polymerization of lactones, e.g., caprolactone.

Examples of polyisocyanates include diisocyanate compounds, e.g., tolylene diisocyanate, phenylene diisocyanate, diphenylmethane diisocyanate, hexamethylene diisocyanate, tetramethylene diisocyanate, naphthalene diisocyanate, isophorone diisocyanate, xylylene diisocyanate, diisocyanate methylcyclohexane, diisocyanate cyclohexylmethane, dimethoxybiphenylene diisocyanate, and diisocyanate diphenyl ether; and triisocyanate compounds, e.g., a trimer of tolylene diisocyanate and a trimer of hexamethylene diisocyanate, which constitute 7 mole percent or less of the entire isocyanate groups.

Examples of polyester polyurethane resins include aliphatic polyester polyurethane resins and aromatic polyester polyurethane resins produced by a reaction between polyester polyols and isocyanates. An aliphatic polyester polyol or an aromatic polyester polyol is used as the polyester polyol. The aliphatic polyester polyol is produced by a reaction between a glycol component, e.g., ethylene glycol, neopentyl glycol, or the like, and a carboxylic acid component, e.g., adipic acid or other aliphatic dicarboxylic acid. An aromatic polyester polyol is produced by a reaction between a glycol component, e.g., ethylene glycol, neopentyl glycol, or the like, and a carboxylic acid component, e.g., phthalic acid or other aromatic dicarboxylic acid. In the present invention, as described above, an aliphatic polyester polyurethane resin among them is used as an indispensable binder resin component.

Preferably, the aliphatic polyester polyurethane resin is used at a ratio of at least 10 percent by weight, in particular, 10 to 40 percent by weight relative to a total amount of the binder resins. If the ratio exceeds 40 percent by weight, the coating film strength is reduced. On the other hand, preferably, the content of the vinyl chloride resin is 90 percent by weight or less. If the content exceeds 90 percent by weight, the coating film becomes brittle since the vinyl chloride resin is poor in elongation components. Furthermore, preferably, the weight ratio of the vinyl chloride resin to the polyurethane resin containing the aliphatic polyester polyurethane resin is within the range of 8:2 to 2:8, and more preferably is 8:2 to 5:5. In this manner, the strength and the flexibility of the coating film can be brought into excellent balance. Preferably, a total amount of the vinyl chloride resin and the polyurethane resin is 80 to 100 percent by weight relative to the amount of the entire binder resins, and more preferably is 100 percent by weight.

It is necessary that the above-described vinyl chloride resin and the aliphatic polyester polyurethane resin are used as the binder resins of the magnetic layer. However, previously known thermoplastic resins, thermosetting resins, radiation-curing resins, and mixtures thereof may be used simultaneously. Examples of simultaneously usable other resins include vinyl chloride-epoxy copolymers, vinyl chloride-vinyl acetate copolymers, vinyl chloride-vinylidene chloride copolymers, cellulose resins, epoxy resins, polyester resins, polyurethane resins, e.g., aromatic polyester polyurethane and polyether polyurethane, other than the above-described aliphatic polyester polyurethane resins, polyvinyl butyral resins, fibrin resins, and synthetic rubber resins. These are resin materials generally used as binder resins for magnetic recording media.

Preferably, the content of these binder resins used for the magnetic layer is within the range of 5 to 40 parts by weight, in particular, of 10 to 30 parts by weight, relative to 100 parts by weight of the magnetic powder. If the content of the binder resins is too small, the strength of the magnetic layer is reduced and, thereby, the running durability tends to be deteriorated. On the other hand, if the content is too large, the content of the magnetic powder is reduced and, thereby, the electromagnetic conversion characteristic becomes deteriorated.

Examples of cross-linking agents for curing these binder resins may include various known polyisocyanates in the case of thermosetting resins. Preferably, the content of this cross-linking agent is 10 to 30 parts by weight relative to 100 parts by weight of the binder resins.

In the present invention, specific example of aromatic compounds added to the magnetic layer include phthalic acid, isophthalic acid, terephthalic acid, benzoic acid, phenylphosphonic acid, and benzenesulfinic acid. Preferably, phthalic acid having a high effect as a dispersing agent is used. Preferably, the content of the above-described aromatic compounds is within the range of 0.5 to 3 parts by weight relative to 100 parts by weight of the magnetic powder. Furthermore, preferably, a phosphoric acid ester having a number average molecular weight Mn of about 500 to 2,000 is used. Examples thereof may include RE610 produced by TOHO Chemical Industry Co., Ltd., and DP-8 and DP-8R produced by Daihachi Chemical Industry Co., Ltd. The preferable content thereof is within the range of 0.5 to 3 parts by weight relative to 100 parts by weight of the magnetic powder. Reduction in the gloss due to dilution of the paint can be prevented by using these aromatic compounds and phosphoric acid esters. The reason for this is believed that these compounds have the high effect as dispersing agents used for adsorbing the binder resins to the magnetic powder and the like, and are resistant to being affected by the La concentration. Therefore, the dilution stability can be improved only after the above-described aromatic compounds and phosphoric acid ester are combined with the vinyl chloride resin having a degree of polymerization of at least 270 and the aliphatic polyester polyurethane resin. Further excellent dilution stability can be attained when the contents thereof are within the above-described respective preferable ranges.

If necessary, commonly used other dispersing agents, lubricants, abrasives, antistatic agents, curing agents, and the like may be added into the magnetic layer.

The thickness of the magnetic layer is not specifically limited. However, the present invention is effective with respect to a thin magnetic layer having a thickness within the range of about 0.05 to 0.3 µm, in particular, of 0.05 to 0.1 µm, in more particular, of 0.05 to 0.08 µm. If the magnetic layer is too thick, the self-demagnetization loss and the thickness loss are increased. On the other hand, if too thin, the playback output tends to be decreased.

A non-magnetic layer composed of a non-magnetic powder, a binder resin, and the like may be disposed as a layer under the magnetic layer. Various inorganic powders may be used as the non-magnetic powder used for the non-magnetic layer. Preferable examples thereof may include acicular non-magnetic powders, e.g., acicular non-magnetic iron oxide ($\alpha$-$Fe_2O_3$). Various other non-magnetic powders, e.g., calcium carbonate ($CaCO_3$), titanium oxide ($TiO_2$), barium sulfate ($BaSO_4$), and $\alpha$-alumina ($\alpha$-$Al_2O_3$), may be appropriately blended. Preferably, carbon black is used for the non-magnetic layer. Examples of such carbon black may include furnace black for rubber, thermal black for rubber, black for a color, and acetylene black.

Preferably, the compounding ratio of the carbon black to the inorganic powder is 100/0 to 10/90 on a weight ratio basis. If the compounding ratio of the inorganic powder exceeds 90, a problem of surface electric resistance tends to occur.

Binder resins similar to those used for the above-described magnetic layer may appropriately be used as the binder resin for the non-magnetic layer, although not specifically limited. Abrasives, dispersing agents, and various other additives may be added in a manner similar to that in the magnetic layer.

Preferably, the thickness of the non-magnetic layer is 2.5 µm or less, more preferably is 0.1 to 2.3 µm. Even when this thickness exceeds 2.5 µm, improvement of the performance cannot be expected. Conversely, when the coating film is applied, the thickness tends to become uneven. If the thickness is less than 0.1 µm, the capability of the non-magnetic layer to supply lubricant to the magnetic layer is reduced, and the durability tends to be deteriorated.

If necessary, in order to, for example, improve the running stability and prevent electrification of the magnetic layer, a back coat layer may be disposed on a surface opposite to the surface provided with the non-magnetic layer and the magnetic layer of the non-magnetic support, although not indispensable in the present invention. Preferably, the back coat layer contains 30 to 80 percent by weight of carbon black. The carbon black may be of any type in common use, and the carbon black similar to that used in the above-described non-magnetic layer may be used. In addition to the carbon black, if necessary, non-magnetic inorganic powders, e.g., various abrasives, used for the magnetic layer; dispersing agents, e.g., surfactants; lubricants, e.g., higher aliphatic acids, aliphatic acid esters, and silicone oil; and various other additives may be added.

The thickness of the back coat layer (after calendering) is 0.1 to 1.0 µm, and preferably is 0.2 to 0.8 µm. If this thickness exceeds 1.0 µm, friction between a medium sliding contact path and the back coat layer becomes too large and, thereby, the running stability tends to be deteriorated. On the other hand, if the thickness is less than 0.1 µm, shaving of the coating film of the back coat layer tends to occur during running of the medium.

As for the non-magnetic support, those made of publicly known materials, for example, polyesters, e.g., polyethylene terephthalate (PET) and polyethylene naphthalate (PEN), polyolefins, polyamides, polyimides, poly(amide-imide), polysulfone cellulose triacetates, and polycarbonates, may be appropriately used. The thickness thereof and the like may be appropriately determined within the known range, and is not specifically limited.

The solvent used for forming the above-described magnetic layer and the like is not specifically limited. Various organic solvents in common use may be appropriately used alone or in combination of at least two thereof. Examples of solvents include cyclohexanone, methyl ethyl ketone (MEK), methyl isobutyl ketone, toluene, ethyl acetate, and tetrahydrofuran, and these are suitable for dissolving the binder resins. Preferably, cyclohexanone is used in such a manner that the content becomes at least 60 percent by weight in the entire solvents contained in the paint during the coating. As a result, the binder resins are excellently dissolved and, thereby, a coating film having excellent surface property can be formed. Cyclohexanone has a high boiling point and, therefore, is resistant to being dried even when a thin layer is formed by the coating and, therefore, the amount of coating is small. Consequently, the wet condition of the coating film in an orientation device is readily controlled, and there is an advantage that the magnetic powder is readily oriented. More preferably, other solvents, methyl ethyl ketone and toluene, are used while the ratio of methyl ethyl ketone to toluene is controlled at about 2/8 to 8/2. The amount of addition of these organic solvents is preferably specified to be about 100 to 2,000 parts by weight relative to 100 parts by weight of a total amount of solids (magnetic powder, various inorganic particles, and the like) and the binder resins.

A coating method used for forming the above-described magnetic layer and the like on the non-magnetic support by coating is not specifically limited. Examples of suitable methods include an extrusion coating method, a reverse roll coating method, a gravure roll coating method, a knife coater coating method, a doctor blade coating method, a kiss coat coating method, a color coat coating method, and a slide bead coating method. Among them, the extrusion coating method is particularly suitable from the viewpoint of evenness in thickness of the coating film.

Techniques for forming a double-layered coating film by applying magnetic paint to a non-magnetic support with a non-magnetic layer therebetween includes a wet-on-wet (W/W) coating method in which non-magnetic paint is applied to a non-magnetic support and, thereafter, magnetic paint is applied while this non-magnetic paint is in a wet condition and a wet-on-dry (W/D) coating method in which at least application of non-magnetic paint and drying are performed and, thereafter, application of magnetic paint, an orientation treatment, drying, and calendering are performed. The present invention is particularly effective at preparing magnetic paint used for the W/D coating method in which the magnetic paint having a low paint concentration must be prepared. In this case, when the non-magnetic layer swells during application of the magnetic paint to deteriorate the surface property of the magnetic layer, curing reaction by cross-linking of the binder resins contained in the non-magnetic layer must be effected to some extent. The curing reaction by cross-linking in the non-magnetic layer may be completed by a heat treatment or electron beam (EB) irradiation after the magnetic layer is formed.

When the magnetic recording medium of the present invention is manufactured, the final concentration of the magnetic paint during the application is specified to be 2.0 percent by weight or less in terms of the ratio of the binder resins relative to the total sum of the binder resins and the solvent, that is, the above-described La concentration. The paint is stabilized only after dispersed pigments are covered with the resin and the resin is in the state of being spread over. If the amount of the solvent (menstruum) is extremely large, the three-dimensional structure formed by the resin cannot be maintained. At the same time, the resin covering the pigment surfaces is dissolved into the solvent so as to be separated and eliminated from the pigments and, thereby, the pigments are coagulated. In particular, it is known that this coagulation becomes significant when the La concentration becomes 2.0 percent by weight or less. The present invention is characterized in that even when dilution is performed to attain such an extent of low concentration, the paint gloss at a high concentration can be excellently maintained, that is, the dilution stability of the magnetic paint can be adequately ensured.

EXAMPLES

The present invention will be specifically described below with reference to examples.

Example 1

| (Preparation of magnetic paint) | |
|---|---|
| Magnetic powder (Co/Fe = 20 atomic percent, Al/(Co + Fe) = 11.8 atomic percent, Y/(Co + Fe) = 2.3 atomic percent, BET specific surface area = 58 m$^2$/g, average major-axis length = 0.10 µm, standard deviation of major-axis length = 0.020 µm, Hc = 150 kA/m (=1,885 Oe), σs = 138 Am$^2$/kg (=138 emu/g)) | 100.0 parts by weight |
| Binder resin vinyl chloride resin (trade name: MR110 (degree of polymerization 300) produced by ZEON Corporation) | 9.6 parts by weight |

| (Preparation of magnetic paint) | |
| --- | --- |
| Binder resin aliphatic polyester polyurethane resin (solids) (trade name: UR8700 produced by Toyobo Co., Ltd.) | 1.6 parts by weight |
| Binder resin aliphatic polyester polyurethane resin (solids) (trade name: UR8200 produced by Toyobo Co., Ltd.) | 4.8 parts by weight |
| Dispersing agent phosphoric acid ester (trade name: RE610 produced by TOHO Chemical Industry Co., Ltd., monoester (Mn 700):diester (Mn 1,300) = 4:6) | 1.0 part by weight |
| Dispersing agent Phthalic acid | 1.0 part by weight |
| Abrasive α-alumina (trade name: HIT60A produced by Sumitomo Chemical Co., Ltd., average particle diameter: 0.18 μm) | 10.0 parts by weight |
| Solvent MEK | 109 parts by weight |
| toluene | 109 parts by weight |
| cyclohexanone | 81 parts by weight |

The above-described materials except a part of the solvent were kneaded with a kneader and, thereafter, the remaining solvent was added to perform dilution. Dispersion was performed as pre-dispersion with a horizontal pin mill filled in with zirconia beads of 0.8 mm at a filling factor of 80% (void fraction 50 percent by volume). At this time, the paint was characterized by:

NV (solid concentration)=30% (percentage by weight),

La concentration (=resin/(resin+solvent)) 5.1 percent by weight, and

Solvent ratio MEK/toluene/cyclohexanone=36/36/28 (weight ratio).

This paint was diluted in order that a final paint was characterized by:

NV (solid concentration)=10% (percentage by weight),

La concentration (=resin/(resin+solvent)) 1.4 percent by weight, and

Solvent ratio MEK/toluene/cyclohexanone=20/20/60 (weight ratio), and finishing dispersion was performed.

The dilution stability of the thus prepared magnetic paint was evaluated as described below.

<Evaluation of Dilution Stability>

A film of the above-described final paint after the dilution was formed on a glass plate with an applicator having a gap of 24.5 μm, and a measurement was performed with a gloss monitor (Gloss Monitor (incident angle and reflection angle 60°) produced by MURAKAMI COLOR RESEARCH LABORATORY). The gloss value before the dilution was 160%. The dilution stability becomes better as the change in the gloss value becomes small, that is, the gloss value after the dilution is large.

A curing agent (Coronate L produced by NIPPON POLYURETHANE INDUSTRY CO., LTD.) was added to the resulting paint by 3.2 parts by weight in terms of the solid, followed by mixing. Subsequently, filtration was performed with a filter having an absolute filtration precision of 1.0 μm, so that magnetic paint was prepared.

| (Preparation of non-magnetic paint) | |
| --- | --- |
| Pigment acicular α-FeOOH (average major-axis length: 0.1 μm, crystallite diameter: 12 nm) | 80.0 parts by weight |
| Carbon black (trade name: #950B produced by | 20.0 parts by weight |

| (Preparation of non-magnetic paint) | |
| --- | --- |
| MITSUBISHI CHEMICAL CORPORATION, average particle diameter: 17 nm, BET specific surface area value: 250 m²/g, DBP oil absorption: 70 ml/100 g, pH: 8) | |
| Binder resin vinyl chloride resin (trade name: TB-0246 produced by Toyobo Co., Ltd., (solid) vinyl chloride-epoxy containing monomer copolymer, average degree of polymerization: 310, S content through the use of potassium persulphate: 0.6% (percentage by weight), an acryl-modified resin derived from MR110 produced by ZEON Corporation, through the use of 2-isocyanate ethyl methacrylate (MOI), acryl content: 6 mol/1 mol) | 11.0 parts by weight |
| Binder resin polyurethane resin (trade name: TB-0216 produced by Toyobo Co., Ltd., (solid) hydroxy containing acrylic compound-phosphonic acid group containing phosphorous compound-hydroxy containing polyester polyol, average molecular weight: 13,000, P Content: 0.2% (percentage by weight), acryl content: 8 mol/1 mol) | 9.0 parts by weight |
| Dispersing agent phosphoric acid ester (trade name: RE610 produced by TOHO Chemical Industry Co., Ltd.) | 3.2 part by weight |
| Abrasive α-alumina (trade name: HIT60A produced by Sumitomo Chemical Co., Ltd., average particle diameter: 0.18 μm) | 5.0 parts by weight |
| NV (solid concentration) = 33% (percentage by weight) | |
| Solvent ratio MEK/toluene/cyclohexanone = 2/2/1 (weight ratio) | |

The above-described materials except a part of the solvent were kneaded with a kneader and, thereafter, the remaining solvent was added to perform dilution. Dispersion was performed with a horizontal pin mill filled in with zirconia beads of 0.8 mm at a filling factor of 80% (void fraction 50 percent by volume). Furthermore, the following materials:

| | |
|---|---|
| Lubricant aliphatic acid<br>(trade name: NAA180 produced by NOF CORPORATION) | 0.5 parts by weight |
| Lubricant aliphatic acid amide<br>(trade name: FATTY AMIDE S produced by Kao Corporation)<br>and | 0.5 parts by weight |
| Lubricant aliphatic acid ester<br>(trade name: NIKKOLBS produced by Nikko Chemicals Co., Ltd.)<br>were added, and dilution was performed in order that<br>NV (solid concentration) = 25% (percentage by weight),<br>and<br>Solvent ratio MEK/toluene/cyclohexanone = 2/2/1<br>(weight ratio)<br>were ensured, followed by dispersing. The resulting paint<br>was further filtrated with a filter having an absolute<br>filtration precision of 3.0 μm, so that non-magnetic paint<br>was prepared. | 1.0 part by weight |
| (Preparation of back coat paint) | |
| Carbon black<br>(trade name: BP-800 produced by Cabot Corporation,<br>average particle diameter: 17 nm, DBP oil absorption: 68 ml/<br>100 g, BET specific surface area value: 210 m$^2$/g) | 75 parts by weight |
| Carbon black<br>(trade name: BP-130 produced by Cabot Corporation,<br>average particle diameter: 75 nm, DBP oil absorption: 69 ml/<br>100 g, BET specific surface area value: 25 m$^2$/g) | 10 parts by weight |
| Calcium carbonate<br>(Hakuenka O produced by Shiraishi Kogyo Kaisha, Ltd.,<br>average particle diameter: 30 nm) | 15 parts by weight |
| Nitrocellulose<br>(trade name: BTH1/2 produced by Asahi Kasei<br>Corporation) | 65 parts by weight |
| Binder resin polyurethane resin<br>(aliphatic polyster diol/aromatic polyster diol = 43/53)<br>NV (solid concentration) = 30% (percent by weight)<br>Solvent ratio MEK/toluene/cyclohexanone = 1/1/1<br>(weight ratio) | 35 parts by weight |

The above-described materials except a part of the solvent were kneaded with a kneader and, thereafter, the remaining solvent was added to perform dilution. Dispersion was performed with a horizontal pin mill filled in with zirconia beads of 0.8 mm at a filling factor of 80% (void fraction 50 percent by volume). Furthermore, dilution was performed in order that NV (solid concentration)=10% (percentage by weight), and Solvent ratio MEK/toluene/cyclohexanone=5/4/1 (weight ratio)

were ensured, followed by dispersing. A curing agent (trade name: Coronate L produced by NIPPON POLYURETHANE INDUSTRY CO., LTD.) was added to the thus produced paint by 5 parts by weight, followed by mixing. Subsequently, filtration was further performed with a filter having an absolute filtration precision of 1.0 μm, so that back coat paint was prepared.

A sample of a magnetic recording medium was prepared in the following manner by the use of each of the magnetic paint, non-magnetic paint, and back coat paint produced as described above.

(Non-Magnetic Layer Application Step)

A raw article coated with the non-magnetic layer was prepared in the following manner.

The non-magnetic paint was applied to a PEN support of 6.2 μm in thickness by an extrusion coating with a nozzle in order that the thickness after calendering became 2.0 μm. After drying, processing was performed with a calender in which plastic rolls and metal rolls were combined under the condition that the number of nip was four, the processing temperature was 100° C., the linear pressure was 3,500 N/cm, and the speed was 150 m/min. Furthermore, electron beam irradiation was performed at 4.5 Mrad, so that a non-magnetic layer was formed.

(Magnetic Layer and Back Coat Layer Application Step)

A magnetic layer was applied to the non-magnetic layer formed as described above with a nozzle in order that the thickness after processing became 0.08 μm, and orientation and drying were performed. Subsequently, processing was performed with a calender in which plastic rolls and metal rolls were combined under the condition that the number of nip was four, the processing temperature was 100° C., the linear pressure was 3,500 N/cm, and the speed was 150 m/min, so that a magnetic layer was formed. Furthermore, back coat paint was applied with a nozzle to a surface opposite to the surface provided with the non-magnetic layer and the magnetic layer, followed by drying in order that the thickness after drying became 0.6 μm. Thereafter, processing was performed with a calender in which plastic rolls and metal rolls were combined under the condition that the number of nip was four, the processing temperature was 80° C., the linear pressure was 3,500 N/cm, and the speed was 150 m/min, so that a back coat layer was formed.

A raw article for magnetic recording medium produced as described above was heat-cured at 60° C. for 48 hours, and was cut to have a width of ½", so that a data tape was prepared as a magnetic recording medium sample of Example 1. The resulting tape sample was incorporated into a cartridge, and the output was measured as described below. The results of the output measurement are shown in the following Table 1 together with the outline of the composition of the magnetic layer, evaluation results of the dilution stability (the gloss value), and the surface roughness measured with a three-dimensional surface roughness tester.

(Output Measurement)

The tape incorporated into a cartridge was subjected to a measurement by the use of LTO Small Format Tape Evaluation System (LTO SFTES) produced by Measurement Analysis Corporation. An LTO Ultrium-1 drive-equipped head was used as a head and loading was performed so as to measure broad band SNR (BBSNR).

Examples 2 to 8 and Comparative Examples 1 to 4

A magnetic recording medium sample of each of Examples and Comparative examples was prepared as in Example 1 except that the amounts of compounding of phosphoric acid ester, phthalic acid, vinyl chloride resin, and polyurethane resin in the composition of the magnetic paint and the thickness of the magnetic layer after processing were changed to those shown in the following Table 1, and each measurement was performed as in Example 1.

The results thereof are also shown in the following Table 1. In Table 1, all numerical values of the amount of compounding are on a part by weight basis.

Examples 9 and 10

A magnetic recording medium sample of each Examples was prepared in the following manner under such conditions that amounts of compounding of phosphoric acid ester, phthalic acid, vinyl chloride resin, and polyurethane resin in the composition of the magnetic paint, and the thickness of the magnetic layer after processing were changed to those shown in the following Table 1.

The non-magnetic paint was applied to a PEN support of 6.2 μm in thickness with a nozzle in order that the thickness after calendaring became 2.0 μm, and simultaneously the magnetic paint was applied to the applied non-magnetic paint with the nozzle in order that the thickness after processing became those shown in the following Table 1. After drying, processing was performed with a calendar in which plastic rolls and metal rolls were combined under the condition that the number of nip was four, the processing temperature was 100° C., the linear pressure was 3,500 N/cm, and the speed was 150 m/min, so that magnetic layer was formed on the non-magnetic layer. Furthermore, back coat paint was applied with a nozzle to a surface opposite to the surface provided with the non-magnetic layer and magnetic layer, followed by drying, and cutting to have a width of ½", as in Example 1, so that a data tape was prepared as a magnetic recording medium sample to perform the same measurements as in Example 1.

The results thereof are also shown in the following Table 1. In Table 1, all numerical values of the amount of compounding are on a part by weight basis.

TABLE 1

| | | | Vinyl chloride resin | | | | | | | | |
| --- | --- | --- | --- | --- | --- | --- | --- | --- | --- | --- | --- |
| | Phosphoric acid ester | Phthalic acid | MR110 (degree of polymerization 300) | MR104 (degree of polymerization 260) | Polyurethane resin | | Dilution stability (%) | Coating method | Thickness of magnetic layer (μm) | Surface roughness SRa (nm) | Output BBSNR (dB) |
| | | | | | UR8700 (aliphatic) | UR8200 (aromatic) | | | | | |
| Example 1 | 1.0 | 1.0 | 9.6 | — | 1.6 | 4.8 | 158 | W/D | 0.08 | 4.0 | +1.0 |
| Example 2 | 0.5 | 2.0 | 9.6 | — | 1.6 | 4.8 | 155 | W/D | 0.08 | 4.5 | 0.0 |
| Example 3 | 2.0 | 0.5 | 9.6 | — | 1.6 | 4.8 | 158 | W/D | 0.08 | 4.1 | +0.8 |
| Example 4 | 3.0 | 1.0 | 9.6 | — | 1.6 | 4.8 | 158 | W/D | 0.08 | 4.0 | +1.0 |
| Example 5 | 1.0 | 3.0 | 9.6 | — | 1.6 | 4.8 | 158 | W/D | 0.08 | 3.9 | +1.2 |
| Example 6 | 1.0 | 1.0 | 9.6 | — | 6.4 | — | 158 | W/D | 0.08 | 4.0 | +1.0 |
| Example 7 | 1.0 | 1.0 | 9.6 | — | 1.6 | 4.8 | 158 | W/D | 0.10 | 4.2 | +0.7 |
| Example 8 | 1.0 | 1.0 | 9.6 | — | 1.6 | 4.8 | 158 | W/D | 0.28 | 4.6 | −1.0 |
| Example 9 | 1.0 | 1.0 | 9.6 | — | 1.6 | 4.8 | 158 | W/W | 0.08 | 4.5 | 0.0 |
| Example 10 | 1.0 | 1.0 | 9.6 | — | 1.6 | 4.8 | 158 | W/W | 0.28 | 5.0 | −2.0 |
| Comparative example 1 | — | 2.0 | 9.6 | — | 1.6 | 4.8 | 145 | W/D | 0.08 | 6.5 | −4.4 |
| Comparative example 2 | 2.0 | — | 9.6 | — | 1.6 | 4.8 | 150 | W/D | 0.08 | 6.0 | −3.4 |
| Comparative example 3 | 1.0 | 1.0 | — | 9.6 | 1.6 | 4.8 | 150 | W/D | 0.08 | 5.8 | −3.0 |
| Comparative example 4 | 1.0 | 1.0 | 9.6 | — | — | 6.4 | 145 | W/D | 0.08 | 6.3 | −4.0 |

As appeared from the above-described Table 1, in every Example in which the magnetic layer containing all the vinyl chloride resin having a degree of polymerization of at least 270 and an aliphatic polyester polyurethane resin to serve as binder resins, phthalic acid, and a phosphoric acid ester, change in the gloss value is small and the dilution stability is excellent. Furthermore, the surface roughness is also excellent, and it was ascertained that a stable output was able to be attained. On the other hand, in Comparative examples in which the magnetic layers do not contain at least one of the above-described compounding components, it is clear that the dilution stability is reduced, the surface roughness is also deteriorated and, thereby, the output is deteriorated.

As appeared from Examples 1, 7 to 10, particularly, the dilution stability is not changed but the surface roughness is improved with decreasing thickness of the magnetic layer. Furthermore comparing Examples 1 to 8 using a wet-on dry (W/D) applying process with Examples 9 and 10 using a wet-on wet (W/W) applying process, it is clear that both of the dilution stability are excellent at the same level, but the results of the surface roughness and the output in Examples 1 to 8 using W/D applying process are superior to those in Examples 9, 10 using W/W applying process.

What is claimed is:

1. A method for manufacturing a magnetic recording medium comprising at least one magnetic layer on one surface of a non-magnetic support, comprising:
   (a) applying a magnetic paint to the non-magnetic support, wherein the magnetic paint comprises:
      a magnetic powder;
      binder resins, comprising at least: a vinyl chloride resin having a degree of polymerization of at least 270 and an aliphatic polyester polyurethane resin;
      an aromatic compound selected from the group consisting of phthalic acid, isophthalic acid, terephthalic acid, benzoic acid, phenylphosphonic acid, and benzenesulfinic acid; and
      a phosphoric acid ester having a number average molecular weight of from 500 to 2000;
      and
   (b) regulating the concentration of the magnetic paint during the application in (a) to be 2.0 percent by weight or less in terms of a ratio of the binder resins to a total sum of the binder resins and a solvent.

2. The method for manufacturing a magnetic recording medium according to claim 1, further comprising forming a non-magnetic layer on the non-magnetic support.

3. The method for manufacturing a magnetic recording medium according to claim 2, wherein the forming of a non-magnetic layer on the non-magnetic support comprises:
   (a) applying a non-magnetic paint to the non-magnetic support, and
   (b) drying.

4. The method of manufacturing a magnetic recording medium according to claim 1, wherein the content of the aromatic compound is 0.5 to 3 parts by weight relative to 100 parts by weight of the magnetic powder.

5. The method of manufacturing a magnetic recording medium according to claim 1, wherein the content of the phosphoric acid ester is 0.5 to 3 parts by weight relative to 100 parts by weight of the magnetic powder.

6. The method of manufacturing a magnetic recording medium according to claim 1, wherein a ratio of aliphatic polyester polyurethane resin to the total amount of the binder resins is at least 10 percent by weight.

7. The method of manufacturing a magnetic recording medium according to claim 1, wherein a weight ratio of the vinyl chloride resin to the polyurethane resin is from 8:2 to 2:8.

8. The method of manufacturing a magnetic recording medium according to claim 1, wherein the magnetic layer has a thickness of 0.05 to 0.3 μm.

9. The method of manufacturing a magnetic recording medium according to claim 1, wherein the magnetic layer comprises 70 to 90 percent by weight of magnetic powder.

10. The method of manufacturing a magnetic recording medium according to claim 1, wherein the vinyl chloride resin has a degree of polymerization of from 300 to less than 400.

11. The method of manufacturing a magnetic recording medium according to claim 1, wherein the aromatic compound is phthalic acid.

* * * * *